United States Patent [19]

Takamatsu

[11] Patent Number: 5,362,010
[45] Date of Patent: Nov. 8, 1994

[54] CLUTCH DEVICE FOR FISHING REEL

[75] Inventor: Shingo Takamatsu, Saitama, Japan

[73] Assignee: Daiwa Seiko, Inc., Tokyo, Japan

[21] Appl. No.: 835,390

[22] Filed: Feb. 14, 1992

[30] Foreign Application Priority Data

Feb. 15, 1991 [JP] Japan ............... 3-012714[U]

[51] Int. Cl.⁵ ........................................... A01K 89/00
[52] U.S. Cl. ................................................ 242/261
[58] Field of Search ................... 242/259, 260, 261; 192/67 R, 108

[56] References Cited

U.S. PATENT DOCUMENTS

| | | | |
|---|---|---|---|
| 4,014,422 | 3/1977 | Morishita | 192/67 R |
| 4,179,084 | 12/1979 | Noda | 242/261 |
| 4,394,991 | 7/1983 | Noda | 242/321 |
| 4,648,566 | 3/1987 | Furomoto | 192/67 R X |
| 4,899,952 | 2/1990 | Aoki | 242/260 |
| 4,901,944 | 2/1990 | Aoki | 242/260 |
| 5,069,396 | 12/1991 | Noda | 242/261 X |
| 5,123,609 | 6/1992 | Noda | 242/261 |

FOREIGN PATENT DOCUMENTS

| | | |
|---|---|---|
| 55-121670 | 8/1980 | Japan . |
| 59-17174 | 4/1981 | Japan . |
| 1-68777 | 5/1989 | Japan . |

*Primary Examiner*—Daniel P. Stodola
*Assistant Examiner*—Eileen A. Dunn
*Attorney, Agent, or Firm*—Longacre & White

[57] ABSTRACT

In the clutch pinion slidably fitted on a spool shaft so that an engagement projection of the spool shaft can be engaged with and disengaged from a clutch engagement recess of the clutch pinion. The clutch pinion is integrally formed with planar surfaces and inclined surfaces for defining clutch the engagement recess in the form of a transverse slot. The pinion has a pinion tooth portion from one end to the other end thereof, and has an annular engagement portion in the form of an outer peripheral groove in which a clutch plate is engaged. The planar surfaces and the inclined surfaces which are disposed around a clutch engagement recess are integrally connected together in order to reduce a change in the distance between the planar surface, thereby always maintaining a stable rotation transmission and a clutch performance.

11 Claims, 6 Drawing Sheets

CLUTCH DEVICE FOR FISHING REEL

BACKGROUND OF THE INVENTION

This invention relates to a clutch device of a fishing reel which has an improved clutch pinion fitted on a spool shaft and provided with a clutch engagement recess releasably engageable with an engagement projection of the spool shaft.

Conventionally, in a dual-bearing type reel, a clutch is provided between a spool shaft and a pinion being in mesh with a drive gear adapted to be rotated by a handle. The pinion is fitted on the spool shaft for movement along an axis thereof so that a clutch engagement recess of the pinion is releasably engageable with a clutch engagement projection of an oval cross-section formed on the spool shaft.

With respect to the clutch engagement recess of the above conventional pinion, as disclosed in Japanese Utility Model Unexamined Publication No. Sho. 55-121670, Japanese Utility Model Examined Publication No. Sho. 59-17174 and Japanese Utility Model Unexamined Publication No. Hei. 1-68777, a transverse groove which defines the engagement recess is formed by milling in a central portion of one end of the pinion in such a manner that shoulder portions of a semi-cylindrical shape remain at the opposite sides of this recess, respectively, and since a sufficient strength is not obtained only with the shoulder portions when the spool shaft and the pinion engaged with each other, a reinforcement ring is fixedly mounted on the outer periphery of the one end of the pinion for reinforcement purposes by fitting and bonding, fitting and soldering, press-fitting, a fitting and compressive deformation, or the like.

However, the impact and the load, produced when an operating condition is switched over from a spool free condition to a winding condition, are exerted on the clutch engagement recess of the pinion, and as a result, drawbacks, such as the increase of the distance between the shoulder portions as a result of the expansion of the reinforcement ring, the shaking of the ring due to a clearance between the outer periphery of the two shoulder portions and the ring, the impairment of the clutch function due to the disengagement of the ring from the shoulder portions, and the generation of abnormal rotation sounds, have been encountered.

SUMMARY OF THE INVENTION

It is an object of the present invention to solve the problem that when the impact and the load are exerted on the shoulder portions, the reinforcement ring is expanded to increase the distance between the shoulder portions and to impair the clutch function.

It is another object of this invention to provide a clutch device for a fishing reel in which shoulder portions and connecting portions which are disposed around a clutch engagement recess are integrally connected together in order to reduce a change in the distance between the shoulder portions, thereby always maintaining a stable rotation transmission and a clutch performance.

According to the present invention, there is provided a clutch device for a fishing reel wherein a clutch engagement recess of a winding-drive clutch pinion having a tooth portion and an annular engagement portion at its outer periphery is releasably engageable with an engagement projection of a spool shaft rotatably supported on a reel body; CHARACTERIZED in that said clutch engagement recess of said clutch pinion is defined by shoulder portions, between which said engagement projection of said spool shaft is fittable so as to transmit a power, and connecting portions integrally formed with said shoulder portions and interconnecting outer peripheries of said shoulder portions.

The present invention further provides a fishing reel comprising: a reel body; a spool having a spool shaft rotatably supported on the reel body; a handle for inputting rotation torque; gear means for transmitting the rotational torque from the handle to the spool, having a drive gear; and a clutch provided between the spool and gear means for selectively disconnecting the spool from the gear means, including: a machine key provided on the spool shaft; a one-piece pinion slidable fitted on the spool shaft and meshed with the drive gear, having integral shoulder portions and integral connecting portions on one end thereof to define a spline hole engageable with the machine key; and means for moving the one-piece pinion along the spool shaft so that the spline hole is selectively engaged with and disengaged from the machine key.

Each of the machine key and the spline hole is preferably oval in cross section.

The integral shoulder portions and the integral connecting portions preferably define vertical surfaces perpendicular to a rotational axis of the spool shaft and inclined surfaces inclined relative to the vertical surfaces, respectively, and each of the inclined surfaces connects one of the vertical surfaces to the other through a step.

On the other hand, two inclined surfaces may be formed on the integral shoulder portions substantially along liner portions of the oval spline hole, whereas two vertical surfaces may be formed on the integral connecting portions substantially along arcuate portions of the oval spline hole. Each of the inclined surfaces is a slope connecting one of the vertical surfaces to the other through a step.

In addition, because of the integral arrangement of the integral shoulder portions and the integral connecting portions, teeth of the pinion may be formed on the outer circumference of the shoulder portions and connecting portions.

DETAILED DESCRIPTION OF THE PREFERRED EMBODIMENTS

Preferred embodiments of the present invention will now be described with reference to the drawings.

FIGS. 1 to 5 show a first embodiment of the present invention.

Figure 1:
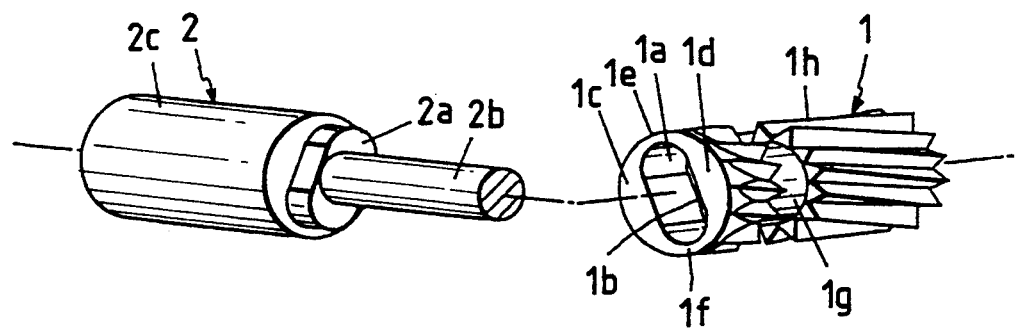
FIG. 1 is an exploded perspective view showing a clutch pinion and a spool shaft in a first embodiment.

A clutch device of the dual bearing-type fishing reel comprises a clutch engagement recess $1a$ of the clutch pinion 1 and an engagement projection $2a$ of the spool shaft 2, which are shown in FIG. 1, and further comprises means for moving the pinion 1 along the axial direction of a spool shaft 2, which includes a clutch plate 3, a slide plate 4, a shaft 5, a clutch lever 6, and a dead point spring 10.

The clutch pinion 1 has at its center a through hole $1b$ into which a smaller-diameter portion $2b$ of the spool shaft 2 is adapted to be fitted, and this clutch pinion has at its one end the clutch engagement recess $1a$ in the form of a transverse slot which is defined by shoulder portions $1c$ and $1d$ of a semi-cylindrical shape and connecting portions $1e$ and $1f$ formed integrally with the shoulder portions to interconnect the outer peripheries of these shoulder portions. An annular engagement portion $1g$ in the form of an outer peripheral groove, with which the clutch plate 3 is engaged, is formed in the clutch pinion, and a pinion tooth portion $1h$ is formed on the clutch pinion from one end to the other end thereof.

The clutch pinion 1 is formed by a numerically-controlled machine tool, and more specifically is formed by the steps of providing a bar material, cutting the outer diameter, forming the through hole $1b$, forming the annular engagement portion $1g$, forming the clutch engagement recess $1a$ by an end mill, cutting the end, supporting the outer diameter, forming the pinion tooth portion $1h$, and so on.

In the dual bearing-type fishing reel incorporating the clutch pinion 1 of the present invention, right and left side frames 11 and 12 are held parallel to each other by a plurality of support bars 13, and reel side plates 14 and 15 are mounted on the outer surfaces of the right and left side frames 11 and 12, respectively.

Figure 2:
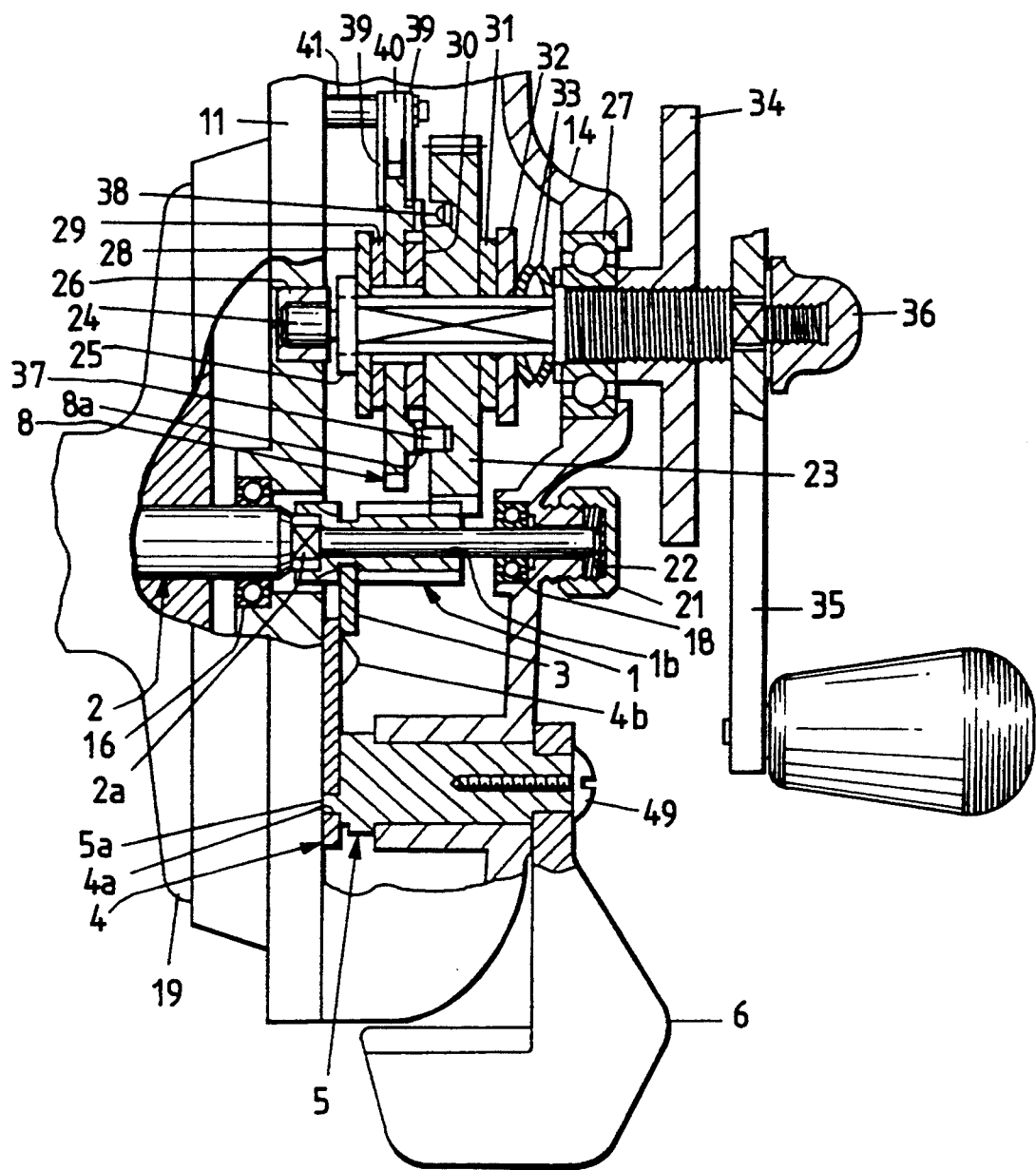
FIG. 2 is an enlarged, cross-sectional, plan view of an important portion of a dual bearing-type fishing reel incorporating the clutch pinion of the present invention.
Figure 3:
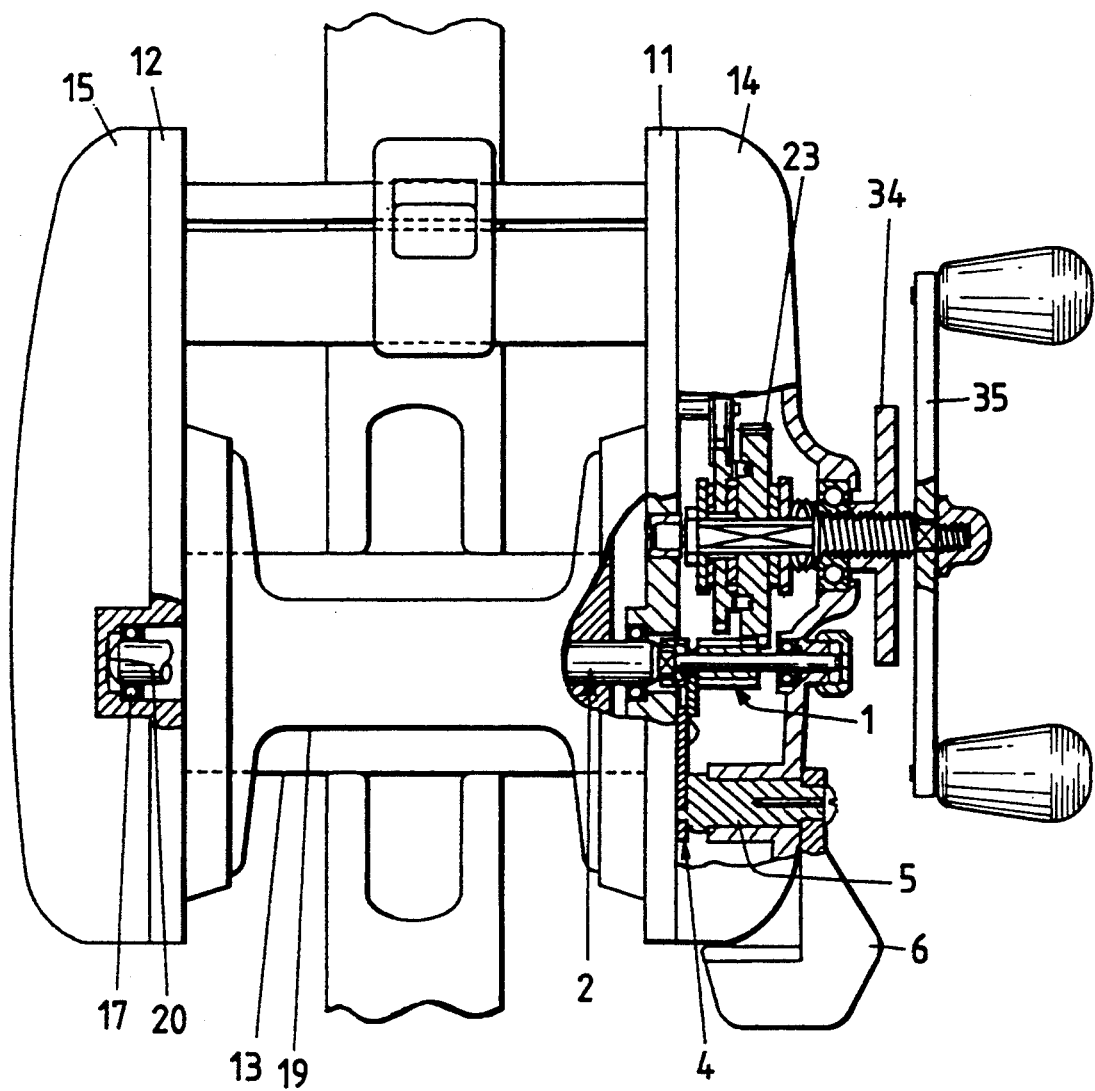
FIG. 3 is a cross-sectional, plan view of an important portion of the dual bearing-type fishing reel.

In FIGS. 2 and 3, bearings 16 and 17 are mounted on the two side frames 11 and 12, respectively, and a bearing 18 is mounted on the reel side plate 14, and the spool shaft 2 is supported by these bearings. A spool 19 fixedly mounted on a larger-diameter portion $2c$ of the spool shaft 2 is rotatably mounted between the right and left side frames 11 and 12.

A fishing line (not shown) is wound on the outer periphery of a winding barrel of the spool 19, and the left end of the spool shaft 2 is held against a thrust bearing 20, and the other end thereof is held against a thrust bearing 22 provided within an adjustment thumbpiece 21.

The clutch pinion 1 is slidably fitted on that portion of the spool shaft 2 disposed within the reel side plate 14, and the engagement projection $2a$ of the spool shaft 2 can be engaged in and disengaged from the clutch engagement recess $1a$ of the clutch pinion 1 by the clutch plate 3, the slide plate 4, the shaft 5 and the clutch lever 6.

A drive gear 23 is in mesh with the tooth portion $1h$ of the clutch pinion 1, and the drive gear 23 is unrotatably fitted on a handle shaft 24, and a collar 25 press-fitted on the handle shaft 24 prevents the drive gear 23 from being displaced in one direction relative to the handle shaft 24.

The handle shaft 24 is supported by a bearing 26, mounted on the side frame 11, and a bearing 27 mounted on the reel side plate 14, and a brake plate 28 is unrotatably fitted on the outer periphery of the handle shaft 24 at the left side of the drive gear 23. A friction plate 29, a ratchet 8 and a friction plate 30 are rotatably fitted on the handle shaft 24, and a friction plate 31 is fitted on the handle shaft at the right side of the drive gear 23, and a brake plate 32 and spring plates 33 and 33 are unrotatably fitted on the handle shaft.

A cylindrical portion of a drag adjustment knob 34 is threaded on the outer periphery of that portion of the handle shaft 24 disposed at the right side of the bearing 27, and by rotating the drag adjustment knob 34, the friction plate 30, the ratchet 8, the friction plate 31, the brake plate 32 and the spring plates 33 and 33 are urged toward the side surfaces of the drive gear 23 through the bearing 27, thereby adjusting the braking force.

A handle 35 is unrotatably fitted on the other end of the handle shaft 24, and a nut 36 is threadingly fixed to this end.

A sound-generating member 37 in the form of a leaf spring is fixedly secured at one end to the side surface of the drive gear 23 by a screw 38, and the other end of the sound-generating member 37 faces a sound-generating convex/concave portion $8a$ formed on that portion of the side surface of the ratchet 8 facing the drive gear 23.

Figure 4:
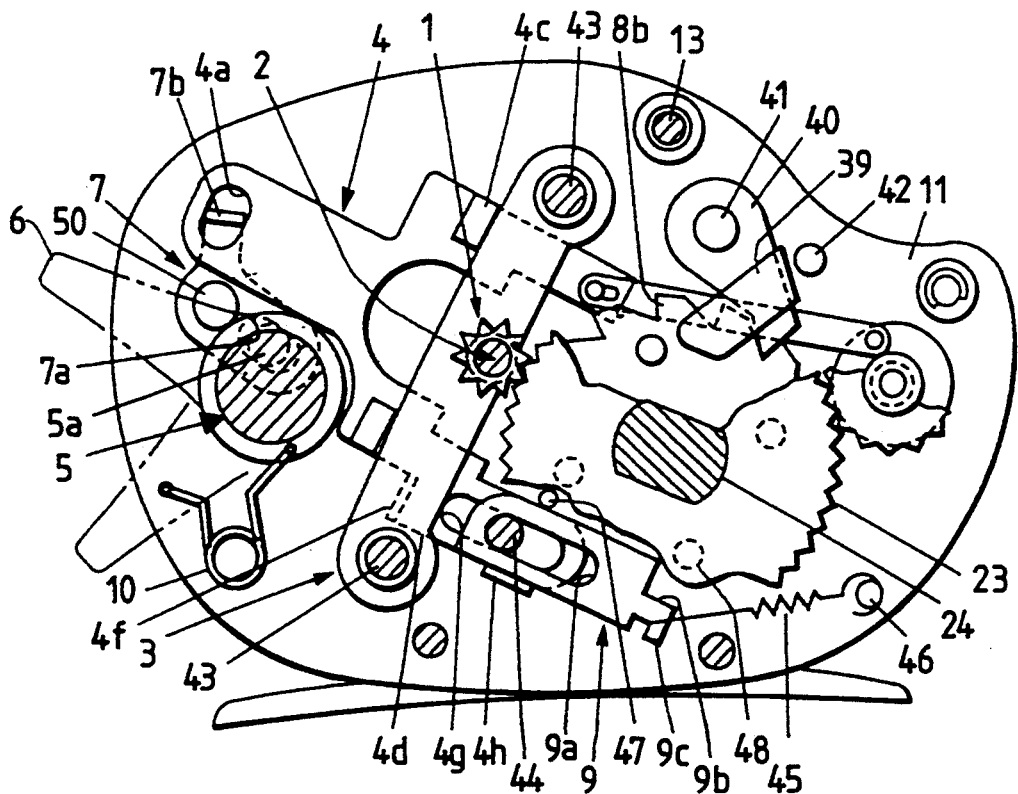
FIG. 4 is a side-elevational view of the dual bearing-type fishing reel.

As shown in FIGS. 2 to 4, a reverse retaining pawl 40, sandwiched between spring plates 39 and 39, is disposed outwardly of the ratchet 8, and is pivotably mounted on a shaft 41. The spring plates 39 and 39 are disposed in contact with the opposite side surfaces of the ratchet 8, respectively, and the distal end of the reverse retaining pawl 40 is so disposed as to be engaged with retaining teeth $8b$ formed on the outer periphery of the ratchet 8.

A pin 42 for limiting the pivotable movement of the reverse retaining pawl 40 is provided outwardly of the reverse retaining pawl 40.

Figure 5:
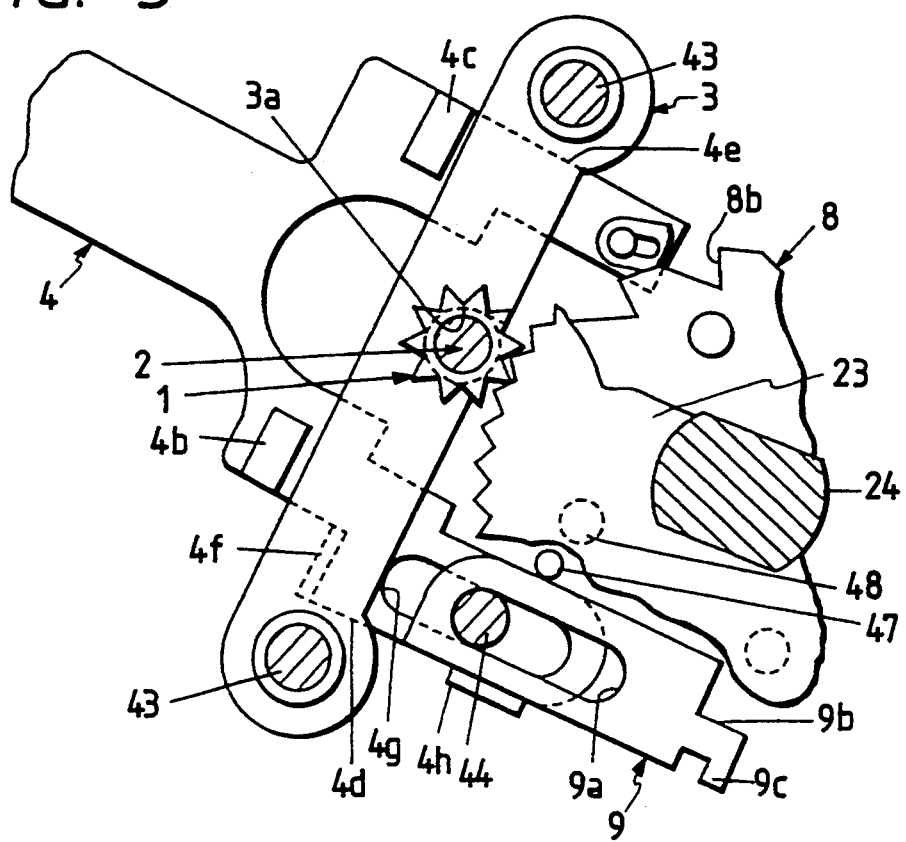
FIG. 5 is an enlarged side-elevational view of an important portion of FIG. 4.

As shown in FIGS. 4 and 5, the clutch plate 3 has an arcuate recess $3a$ adapted to be fitted in the annular engagement portion $1g$ of the clutch pinion 1. The clutch plate 3 is fitted at its opposite ends on support rods 43 and 43 fixedly mounted on the side frame 11, and is urged by a spring (not shown) in the direction of engagement of the engagement projection $2a$ of the spool shaft 2 with the clutch engagement recess $1a$ of the clutch pinion 1.

A pin 44 fixedly mounted on the side frame 11 is fitted in the slot $4g$, and a release piece 9 overlaps the extension piece $4d$, and the pin 44 is fitted in a slot $9a$ formed in the release piece 9.

The release piece 9 has a notch $9b$, a spring retainer portion $9c$, and a spring 45 is engaged at one end with the spring retainer portion $9c$, and the other end of the spring 45 is engaged with a pin 46 fixedly mounted on the side frame 11.

A retaining pin 47 is fixedly mounted on the side frame 11 adjacent to the extension piece 4d and the release piece 9.

A plurality of kick pins 48 are fixedly mounted on the ratchet 8.

The shaft 5 is rotatably mounted on the reel side plate 14, and the clutch lever 6 is fixed to the shaft 5 by a screw 49.

An eccentric engagement portion 5a is formed on the shaft 5, and the dead point spring 10 is engaged at one end with the shaft 5.

In FIGS. 2 and 3, the eccentric engagement portion 5a is received in the engagement portion 4a (lateral slot) of the slide plate 4 so that the clutch plate 3 is slidingly moved along the support rods 43 by the slide plate 4. The slide plate 4 has an engagement portion 4a in the form of a lateral slot, operating portions 4b and 4c for operating the clutch plate 3, extension pieces 4d and 4e arranged in a bifurcated manner, a bent engagement portion 4f, a slot 4g in one extension piece 4d, and a bent portion 4h at one side of the extension piece 4d.

A connecting member 7 may be provided between the slide plate 4 and the shaft 5 as shown in FIG. 4. The connecting member 7 is rotatably supported on the side frame 11 by the shaft 50, and has a slot 7a for the eccentric engagement portion 5a and a bent engagement portion 7b for the engagement portion 4a.

Referring to the operation of the above fishing reel, in a clutch-on condition in which the engagement projection 2a of the spool shaft 2 is engaged in the clutch engagement recess 1a of the clutch pinion 1 in FIGS. 2 and 3, when the handle 35 is rotated, the clutch pinion 1 and the spool shaft 2 are rotated together by the drive gear 23, so that the fishing line is wound on the spool 19.

At this time, the ratchet 8 is rotated clockwise (FIGS. 4 and 5) through the drive gear 23 and the friction plate 30. The spring plates 39 and 39 and the reverse retaining pawl 40 are pivotably moved counterclockwise by the friction between the ratchet 8 and the spring plates 39 and 39, so that the distal end of the reverse retaining pawl 40 is disengaged from the retaining teeth 8b of the ratchet 8, and as a result the ratchet 8 rotates in unison with the drive gear 23.

Then, when the spool 19 is rotated in the reverse direction to feed the fishing line, the drive gear 23 and the ratchet 8 are rotated counterclockwise, and the spring plates 39 and 39 and the reverse retaining pawl 40 are pivotably moved clockwise, so that the distal end of the reverse retaining pawl 40 is engaged with the retaining teeth 8b of the ratchet 8.

This engagement holds the ratchet 8 in a stopped condition, and only the drive gear 23 is rotated, and therefore one end of the sound-generating member 37 fixedly secured at the other end to the drive gear 23 drops from the convex portion to the concave portion of the sound-generating convex/concave portion 8a of the ratchet 8, thereby producing a sound.

Then, when the clutch lever 6 is pivotably moved counterclockwise, that is, downward in FIG. 4, the connecting member 7 is pivotably moved clockwise by the eccentric engagement portion 5a of the shaft 5, so that the slide plate 4 is slidingly moved to the lower right in FIG. 4 by the engagement portion 7b.

In FIGS. 2 and 3, when the clutch lever 6 is pivotably moved, the slide plate 4 is slidingly moved upward by the eccentric engagement portion 5a of the shaft 5.

In this sliding movement, the clutch plate 3 is moved upward along the support rods 43 by the operating portions 4b and 4c, so that the clutch engagement recess 1a of the clutch pinion 1 is disengaged from the engagement projection 2a of the spool shaft 2 to provide a clutch-off condition, and therefore the spool 19 becomes free for rotation.

When the slide plate 4 is slidingly moved as described above, the extension piece 4d is also slidingly moved to the lower right in FIGS. 4 and 5, and therefore the release piece 9, so far retained by the retaining pin 47 and the bent portion 4h against pivotable movement, is pivoted counterclockwise by the spring 45, and the notch 9b of the release piece 9 is brought to a position where it is abuttable with the kick pin 48.

Then, when the handle 35 is rotated, the drive gear 23 and the ratchet 8 are rotated clockwise in FIGS. 4 and 5, and the kick pin 48 abuts the notch 9b of the release piece 9, and the release piece 9 is urged back to the left, and the left end of the release piece 9 urges the bent engagement portion 4f of the slide plate 4 upward to retract the slide plate 4, so that the operating portions 4b and 4c are disengaged from the clutch plate 3, and therefore the clutch engagement recess 1a of the clutch pinion 1 is engaged with the engagement projection 2a of the spool shaft 2, thereby providing the clutch-on condition.

When the handle 35 is rotated in the clutch-on condition, the clutch pinion 1 and the spool shaft 2 are rotated to rotate the spool 19, so that the fishing line is wound on the spool 19.

In the above construction of the clutch device of the fishing reel, the semi-cylindrical shoulder portions 1c and 1d at the opposite sides of the clutch engagement recess 1a of the, clutch pinion 1 are integrally interconnected by the connecting portions 1e and 1f, and therefore the strength is reinforced, and particularly, even when the impact and the load, produced when the operating condition is switched from the spool free condition to the winding condition, are exerted on the shoulder portions 1c and 1d, the distance between the shoulder portions 1c and 1d is not increased, because a reinforcement ring as in the conventional art is not used. Therefore, a backlash will not develop between the engagement projection 2a of the spool shaft 2 and the clutch engagement recess 1a of the clutch pinion 1, and the power can be positively transmitted, and the clutch function is not impaired.

Further, drawbacks, such as the increase of the distance between the shoulder portions as a result of the expansion of the conventional reinforcement ring, the shaking of the ring due to a clearance between the outer periphery of the two shoulder portions and the ring, the impairment of the clutch function due to the disengagement of the ring from the shoulder portions, and the generation of abnormal rotation sounds, are improved.

Figure 6:
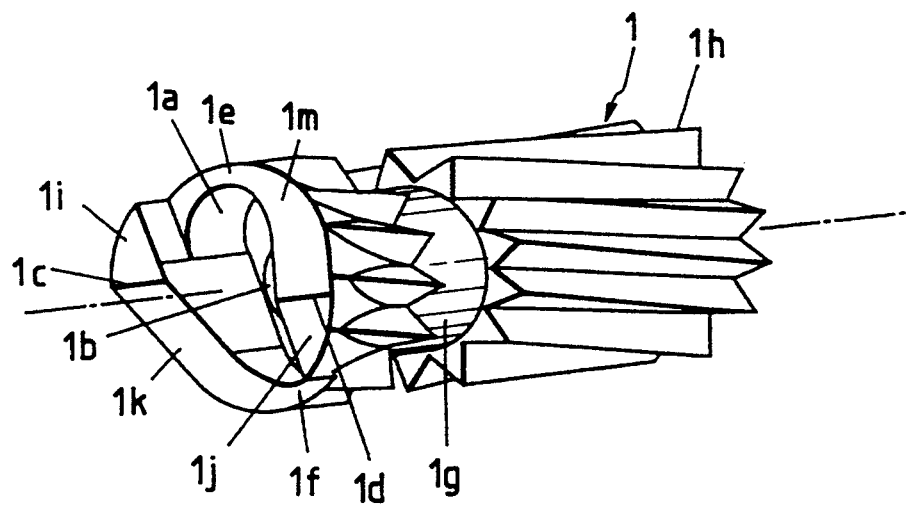
FIG. 6 is a perspective view a clutch pinion according to a second embodiment.
Figure 7:
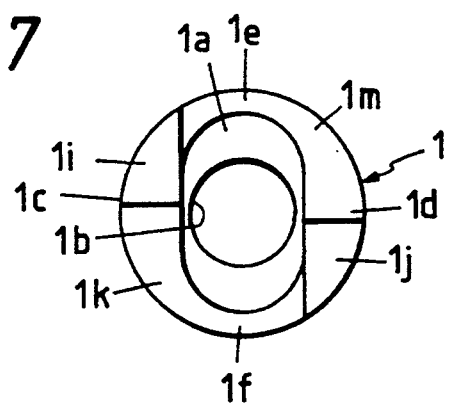
FIG. 7 is a front-elevational view of the above clutch pinion.

FIGS. 6 and 7 show a second embodiment directed to a modification of one end of a clutch pinion 1. FIG. 6 is a perspective view of the clutch pinion, and FIG. 7 is a front-elevational view of the clutch pinion.

Planar surfaces 1i and 1j and inclined surfaces 1k and 1m are formed on the one end of the clutch pinion 1 so that a clutch engagement recess 1a can be easily engaged with the engagement projection 2a of the spool shaft 2.

Figure 8:
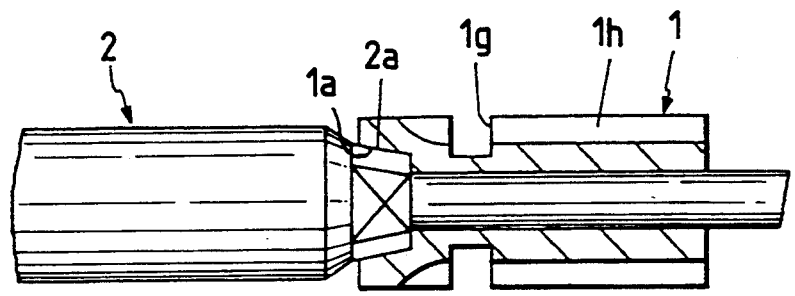
FIG. 8 is a cross-sectional, side-elevational view showing a clutch pinion and a spool shaft provided according to a third embodiment.

FIG. 8 shows a third embodiment directed to a modified clutch engagement recess 1a of a clutch pinion 1 and a modified engagement projection 2a of a spool shaft 2. FIG. 8 is a cross-sectional, side-elevational view showing the clutch pinion 1 and the spool shaft 2.

The clutch engagement recess 1a of the clutch pinion 1 and the engagement projection 2a of the spool shaft 2 are formed respectively by tapered surfaces inclined in the axial direction.

Figure 9:
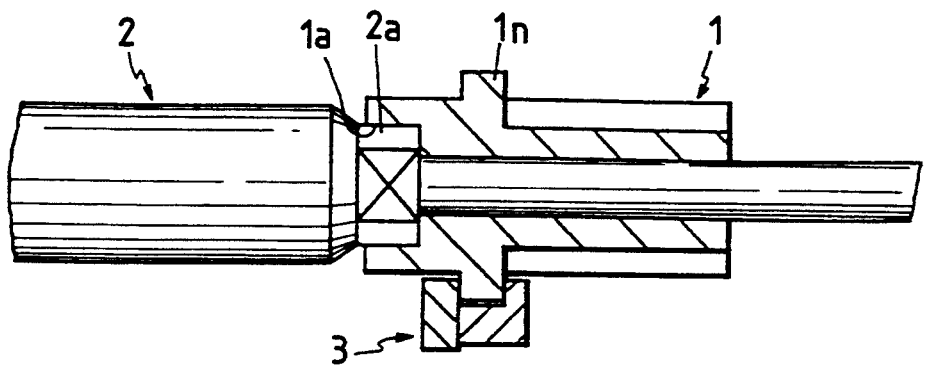
FIG. 9 is a cross-sectional, side-elevational view showing a clutch pinion, a spool shaft and a clutch plate provided according to a fourth embodiment.
Figure 10:
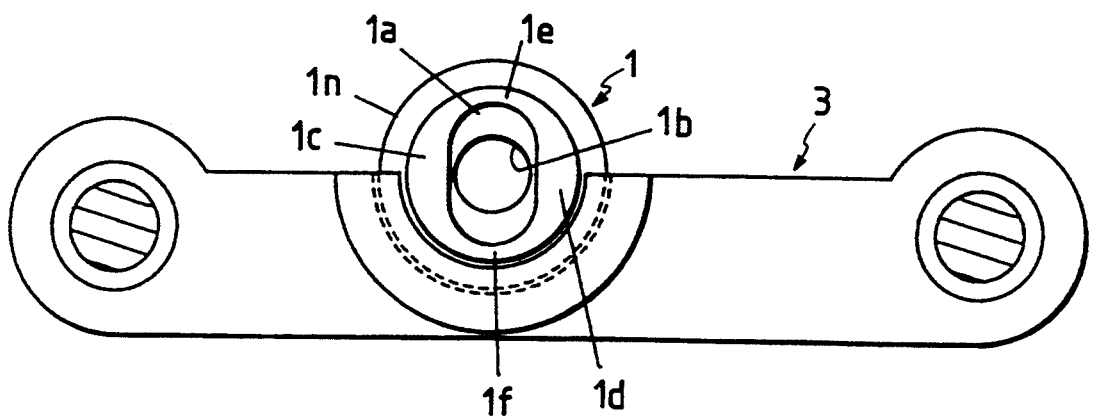
FIG. 10 is a front-elevational view showing the above clutch pinion and the above clutch plate.

FIGS. 9 and 10 show a fourth embodiment in which that portion of a clutch pinion 1 engaged with a clutch plate 3 is modified. FIG. 9 is a cross-sectional, side-elevational view showing the clutch pinion 1, the spool shaft 2 and the clutch plate 3, and FIG. 10 is a front-elevational view showing the clutch pinion 1 and the clutch plate 3.

The annular engagement portion 1g in the form of the outer peripheral groove in the above embodiment is replaced by an annular engagement portion 1n in the form of a projection.

Figure 11:
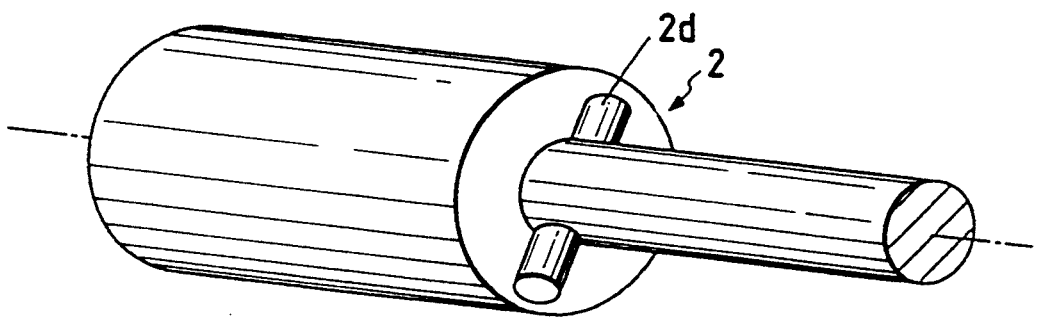
FIG. 11 is a perspective view of a spool shaft according to a fifth embodiment.

FIG. 11 shows a fifth embodiment directed to a modified engagement projection 2a of a spool shaft 2. FIG. 11 is a perspective view showing the engagement projection 2a of the spool shaft 2.

A pin is fixed secured to the spool shaft 2 to form an engagement projection 2d.

Figure 12:
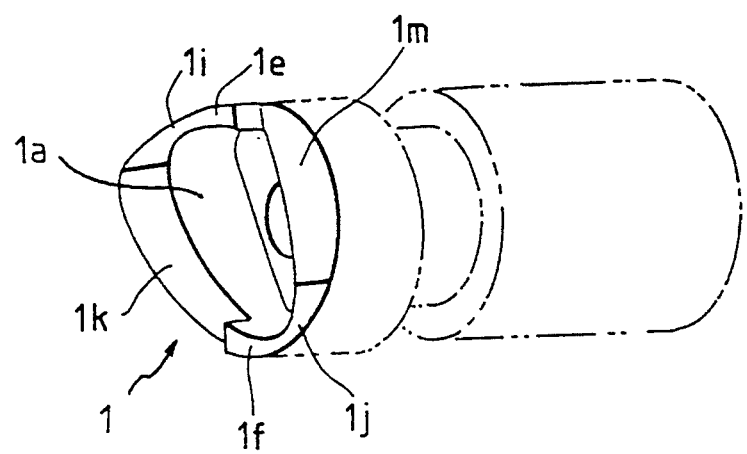
FIG. 12 is a perspective view of a clutch pinion according to a sixth embodiment.
Figure 13:
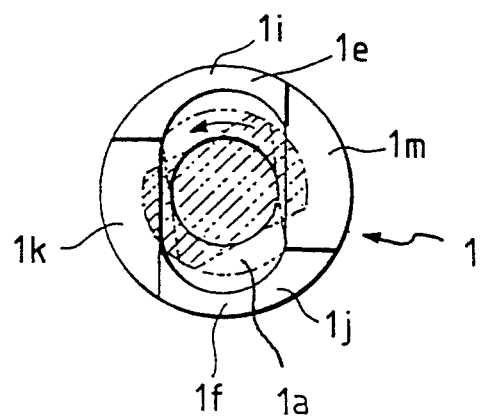
FIG. 13 is a front-elevational view of the above clutch pinion.

FIGS. 12 and 13 show a sixth embodiment directed to another modification of one end of a clutch pinion 1. This embodiment is similar to the above noted second embodiment, but two planar surfaces 1i and 1j are formed on the one end of the clutch pinion 1 substantially around arcuate portions of the clutch engagement recess 1a and two inclined surfaces 1k and 1m are formed substantially along liner portions of the clutch engagement recess 1a. Each of the inclined surfaces 1k and 1m is a slope which connects one of the vertical surfaces to the other through a step.

The inclined surfaces of this embodiment as well as the second embodiment, functions such that when the operating condition is switched over from the spool free condition to the winding condition by rotating the handle, the inclined surfaces guide the engagement projection 2a to be easily and securely engaged with the clutch engagement recess 1a, so that such idle rotation that the engagement projection 2a is rotated relative to the engagement recess 1a while being in contact with the engagement recess 1a is positively prevented. Therefore, it is possible to prevent the abrasion of the engagement projection 2a and the clutch engagement recess 1a due to such idle rotation at the time when the operating condition is switched over from the spool free condition to the winding condition.

In the present invention, as described above, the strength of the clutch engagement recess of the clutch pinion is reinforced, and particularly even when the impact and the load, produced when the operating condition is switched from the spool free condition to the winding condition, are exerted on the shoulder portions, the distance between the shoulder portions is not increased because the reinforcement ring as in the prior art is not used. Therefore, a backlash will not develop between the engagement projection of the spool shaft and the clutch engagement recess of the clutch pinion, and the power can be positively transmitted, and the clutch function is not impaired. Therefore, there can be provided the clutch device of the fishing reel which achieve these excellent practical advantages.

In addition, the present invention has been explained along the embodiments of the double bearing type fishing reels. However, the present invention should not be restricted thereto or thereby. For example, the present invention is also applicable to a single bearing type fishing reel in which a spool shaft is rotatably supported on a reel body through a single bearing provided in the reel body.

What is claimed is:

1. A fishing reel comprising:
   a reel body;
   a spool having a spool shaft rotatably supported on said reel body for rotation about an axis;
   a handle for inputting rotational torque;
   gear means for transmitting the rotational torque from said handle to said spool, said gear means including a drive gear connected to said handle and a pinion slidably fitted on said spool shaft and meshed with drive gear; and
   a clutch provided between said spool and gear means for selectively disconnecting said spool from said gear means, said clutch including:
   a machine key provided on said spool shaft;
   said pinion having a plurality of planar surfaces which are orthogonal to said axis at an axial terminus of said pinion, and a plurality of inclined surfaces which are oblique with respect to said plurality of planar surfaces, said pluralities of planar surfaces and inclined surfaces circumscribe a spline hole engageable with said machine key; and
   means for sliding said pinion along said axis so that said spline hole is selectively engaged with and disengaged from said machine key.

2. The fishing reel according to claim 1, wherein said planar surfaces and said inclined surfaces define a part of an outer circumference surface of said pinion on which pinion teeth are formed.

3. The fishing reel according to claim 1, wherein each of said machine key and said spline hole is oval in cross section.

4. The fishing reel according to claim 3, wherein said inclined surfaces are arranged on opposite sides of a major axis of said oval cross section, and said planar surfaces are arranged on opposite sides of a minor axis of said oval cross section.

5. The fishing reel according to claim 3, wherein said planar surfaces are arranged on opposite sides of a major axis of said oval cross section, and said inclined surfaces are arranged on opposite sides of a minor axis of said oval cross section.

6. The fishing reel according to claim 1, wherein said planar surfaces and said inclined surfaces alternately circumscribe said spline hole; and
   said clutch further comprises an axial step between said planar surfaces and one of said inclined surfaces which are adjacent to each of said planar surfaces.

7. The fishing reel according to claim 6, wherein said step is parallel to said axis.

8. A clutch device for a fishing reel comprising a clutch means for effecting driving engagement between a spool shaft and a drive clutch pinion, said spool shaft and said drive clutch pinion are coaxial with respect to a common axis of rotation; said drive clutch pinion including a clutch engagement recess extending into said drive clutch pinion from an axial terminus of said drive clutch pinion, said clutch engagement recess is circumscribed by a plurality of planar surfaces and a plurality of inclined surfaces; said plurality of planar surfaces lie in a common plane which is orthogonal to said axis and located at said axial terminus; and, said plurality of inclined surfaces are inclined obliquely with respect to said common plane.

9. The clutch device according to claim 8, wherein said clutch engagement recess of said drive clutch pinion is oval in cross-section.

10. The clutch device according to claim 8, wherein said inclined surfaces abut at least one engagement projection of said spool shaft to guide said engagement projection toward engagement with said clutch engagement recess.

11. The clutch device according to claim 8, wherein said planar surfaces and said inclined surfaces are alternately provided on said terminus of said drive clutch pinion where said clutch engagement recess is formed.

* * * * *